United States Patent Office 3,639,456
Patented Feb. 1, 1972

3,639,456
PREPARATION OF ETHER ESTERS OF
CARBOXYLIC ACIDS
Robert A. Dombro, Chicago, Ill., assignor to Universal
Oil Products Company, Des Plaines, Ill.
No Drawing. Filed Feb. 5, 1968, Ser. No. 702,799
Int. Cl. C07c 69/66
U.S. Cl. 260—484 R
12 Claims

ABSTRACT OF THE DISCLOSURE

Ether esters of carboxylic acids are prepared by treating a lactone with a borate ester in the presence of an acidic catalyst to prepare the desired ether ester of the carboxylic acid.

This invention relates to a process for the preparation of ether esters, and particularly to a process for preparing ether esters of carboxylic acids utilizing a lactone and a borate ester as the starting material.

The prior art has shown that treatment of a beta-lactone with an alcohol in the presence of a dehydrating catalyst such as, for example, sulfuric acid, etc., results in the formation of an alkyl ester of an alpha,beta-unsaturated monocarboxylic acid. In addition, it has also been shown in the prior art that when beta-lactones are reacted with alcohols under alkaline conditions, the resulting compound will be an ester of a beta-hydroxy monocarboxylic acid. However, in contradistinction to these prior art processes, it has now been discovered that when a lactone is treated with a borate ester in the presence of an acid catalyst, the resulting compound will give an ether ester of a carboxylic acid. The aforementioned ether esters of carboxylic acids will find a wide variety of use in the chemical field. For example, the compounds which results from the esterification of butyrolactone with triethyl borate, namely, ethyl 4-ethoxybutyrate, possess a musk-like odor and will be utilized in the formulation of fragrances and aromas, these compounds then being compounded with other compositions of matter to prepare the final fragrance or aroma compositions of matter which are used in the preparation of soaps, detergents, shaving creams, colognes, perfumes, etc. In addition, other esters which are prepared according to the process hereandbefore set forth in greater detail may be used as a solvent for plastics, resins, foams, etc.

It is therefore an object of this invention to provide a process for the preparation of ether esters of carboxylic acids.

A further object of this invention is to provide a process for the treatment of lactones with borate esters to prepare compounds which possess desirable physical characteristics such as fragrances, aromas, etc.

In one aspect, an embodiment of this invention resides in a process for the preparation of an ether ester of a carboxylic acid which comprises treating a lactone with a borate ester in the presence of an acidic catalyst at esterification conditions, and recovering the resultant ether ester of a carboxylic acid.

A specific embodiment of this invention is found in the process for the preparation of an ether ester of a carboxylic acid which comprises treating butyrolactone with triethyl borate in the presence of methanesulfonic acid at a temperature in the range of from about 20° to about 200° C. and a pressure in the range of from about atmospheric to about 100 atmospheres, and recovering the resultant ethyl 4-ethoxybutyrate.

Other objects and embodiments will be found in the following further detailed description of the present invention.

As hereinbefore set forth the present invention is concerned with a process for preparing ether esters of carboxylic acids by treating a lactone of the type hereinafter set forth in greater detail with a borate ester in the presence of acidic catalysts at reaction conditions. The reaction conditions which are to be employed in the process of this invention will include temperatures ranging from about 20° to about 200° C., preferably in a range of from about 50° to about 150° C. and at pressures ranging from about atmospheric to about 100 atmospheres. In the preferred embodiment of the invention the reaction is effected at atmospheric pressure. However, if reaction temperatures higher than those hereinbefore specified are used, it is desirable to use superatmospheric pressures, said pressure being that which is sufficient to maintain major portion of the reactant in the liquid phase. The superatmospheric pressures which are used are afforded by charging an inert gas such as nitrogen to the reaction zone.

Examples of lactones which may be employed as one of the starting materials in this process include both unsubstituted and substituted lactones such as beta-propiolactone, gamma-butyrolactone, delta-valerolactone, epsilon-caprolactone, zeta-caprylactone, etc.; 3 - hydroxy - 2 - methylpropionic acid lactone, 3-hydroxy-2-ethylpropionic acid lactone, 3-hydroxy-2-propylpropionic acid lactone, 4-hydroxy-2-methylbutyric acid lactone, 4-hydroxy-2-ethylbutyric acid lactone, 4-hydroxy-2-propylbutyric acid lactone, 4-hydroxy-2,3-dimethylbutyric acid lactone, 4-hydroxy-2,3-diethylbutyric acid lactone, 4-hydroxy-2,3-dipropylbutyric acid lactone, 5-hydroxy-2-methylvaleric acid lactone, 5-hydroxy-2-ethylvaleric acid lactone, 5-hydroxy-2-propylvaleric acid lactone, 5-hydroxy-2,4-dimethylvaleric acid lactone, 5-hydroxy-2,4-diethylvaleric acid lactone, 5-hydroxy-2,4-dipropylvaleric acid lactone, 3-hydroxy-2 - phenylpropionic acid lactone, 4 - hydroxy - 2 - phenylbutyric acid lactone, 5-hydroxy-2-phenylvaleric acid lactone, etc.

The aforementioned lactones are treated with a borate or metaborate ester at conditions hereinbefore set forth so that the lactone ring is initially cleaved to a hydroxy acid. Examples of borate esters or metaborate esters which may be used possess the generic formulas $(RO)_3B$, $(RO)_2BOH$, $ROB(OH)_2$ or $ROBO$ in which R may be an alkyl, aryl, aralkyl, alkaryl, or cycloalkyl group. Some specific examples of these esters will include trimethyl borate, triethyl borate, tri(n-propyl) borate, triphenyl borate, tribenzyl borate, tri(p-tolyl) borate, tri(o-tolyl) borate, tri(m-tolyl) borate, tricyclopentyl borate, tricyclohexyl borate, dimethyl borate, diethyl borate, di(n-propyl) borate, diphenyl borate, dibenzyl borate, di(p-tolyl) borate, di(o-tolyl) borate, di(m-tolyl) borate, dicyclopentyl borate, dicyclohexyl borate, monomethyl borate, monoethyl borate, mono(n-propyl) borate, monophenyl borate, monobenzyl borate, mono(p-tolyl) borate, mono-(o-tolyl) borate, mono(m-tolyl) borate, monocyclopentyl borate, monocyclohexyl borate, methyl metaborate, ethyl metaborate, n-propyl metaborate, phenyl metaborate, benzyl metaborate, p-tolyl metaborate, o-tolyl metaborate, m-tolyl metaborate, cyclopentyl metaborate, cyclohexyl metaborate, etc. In addition, it is also contemplated within the scope of this invention that substituted alkyl borates or metaborates such as triethanolamine borate, diethanolamine borate, triisopropylamine borate, isopropylamine metaborate, 2-aminoethyl metaborate, tris(2-aminopropyl) borate, etc. may also be used, although not necessarily with equivalent results. It is to be understood that the aforementioned lactones and borate esters are only representative of the class of compounds which may be used, and that the present invention is not necessarily limited thereto.

The acidic compositions of matter which are used to catalize the process of this invention include both inorganic acids and organic acids. Specific examples of these catalysts will include the mineral acids such as sulfuric acid, and phosphoric acid, Lewis acids such as boron trifluoride, ferric chloride, zinc chloride, etc., organic acids such as methanesulfonic auid, ethanesulfonic acid, p-toluenesulfonic acid, etc. These catalysts are present in catalytic amounts only.

The process of this invention may be effected in any suitable manner and may comprise either a batch or continuous type operation. For example, when a batch type operation is used, a quantity of the starting material comprising the lactone and the borate ester, said borate ester being present in a mole ratio in a range of from about 0.3 to about 1 mole of borate ester per mole of lactone, are placed in an appropriate apparatus along with a catalytic amount of an acid of the type hereinbefore set forth in greater detail. The apparatus which is used may comprise an alkylation flask provided with heating and stirring means or, if superatmospheric pressures are to be used, a rotating autoclave. The vessel is then heated to the desired operating temperature and maintained thereat for a predetermined period of time which may range from about 0.5 to about 10 hours or more in duration. As hereinbefore set forth, if the reaction is to be effected under superatmospheric pressures, the desired operating pressure may be attained by introducing an inert gas such as nitrogen into the reaction vessel until the desired pressure has been reached. At the end of the aforementioned residence time, the reaction vessel and contents thereof are allowed to cool to room temperature, any excess pressure which is present may be vented, and the vessel opened. The reaction mixture is taken up in ether, washed and dried, and thereafter subjected to fractional distillation under reduced pressure to separate out the desired product comprising the ether ester of the carboxylic acid.

It is also contemplated within the scope of this invention that the process may be effected in a continuous manner of operation. When such a type of operation is used, the starting material comprising the lactone and the borate ester are continuously charged to a reaction vessel which is maintained at the proper operating conditions of temperature and pressure. In addition, the acidic catalyst is also charged thereto through a separate stream or, if so desired, it may be admixed with one or both of the starting materials prior to entry into said reactor, and the resulting mixture charged thereto to a single stream. Upon completion of the desired residence time, the reactor effluent is continuously withdrawn from the reaction vessel and the catalyst is separated therefrom. The reaction mixture is subjected to conventional separation means, such as fractional distillation, fractional crystallation, etc., whereby unreacted starting materials and/or side products which may have formed during the reaction are separated from the desired ether ester of the carboxylic acid. The latter is recovered, while the unreacted starting materials have been separated therefrom are recycled to the reaction vessel to form a portion of the feed stock.

Examples of ether esters of carboxylic acids which may be prepared according to the process of this invention will include methyl 3-methoxypropionate, ethyl 3-ethoxypropionate, propyl 3-propoxypropionate, butyl 3-butoxypropionate, methyl 4-methoxybutyrate, ethyl 4-ethoxybutyrate, propyl 4-propoxybutyrate, butyl 4-butoxybutyrate, phenyl 4-phenoxybutyrate, methyl 5-methoxyvalerate, ethyl 5-ethoxyvalerate, propyl 5-propoxyvalerate, phenyl 5-phenoxyvalerate, methyl 2-methyl-3-methoxypropionate, ethyl 2-ethyl-3-ethoxypropionate, methyl-2-methyl-4-methoxybutyrate, methyl 2-methyl-5-methoxyvalerate, methyl 2,4-dimethyl-5-methoxyvalerate, ethyl 2,4-diethyl-5-ethoxyvalerate, etc. It is to be understood that the aforementioned ether esters of carboxylic acids are only representative of the class of compounds which may be prepared according to this process, and the present invention is not necessarily limited thereto.

The following examples are given to illustrate the process of the present invention which, however, are not intended to limit the generally broad scope of the present invention in strict accordance therewith.

EXAMPLE I

In this example 0.3 mole of gamma-butyrolactone and 0.1 mole of triethylborate were placed in a reaction flask along with a catalytic amount of methanesulfonic acid. The reaction mixture was heated to a temperature of 110° C. and maintained in a range of from about 110° C. to 127° C. for a period of about three hours. At the end of this time the vessel and contents thereof were allowed to return to room temperature. The reaction mixture was recovered, washed with water, and dried. The mixture was then subjected to fractional distillation, the desired product comprising ethyl 4-ethoxybutyrate, having a boiling point of 175° C. and an index of refraction, $n_D^{22}$ 1.426. The presence of this product was identified by means of a nuclear magnetic resonance and infrared analyses. In addition, a second product having a boiling point of about 252° C. at 760 mm. pressure comprising bis-3-(carboxyethyl)propyl ether was also recovered.

EXAMPLE II

In this example 0.3 mole of propiolactone and 0.1 mole of tributyl borate are placed in a reaction vessel along with a catalytic amount of sulfuric acid. The vessel is then heated to a temperature of about 110° C. and is maintained in a range of from about 110° C. to about 125° C. for a period of approximately three hours. At the end of this time, the flask and contents thereof are allowed to cool to room temperature and the reaction mixture is recovered. The mixture, after treatment in a manner similar to that set forth in Example I above is subjected to fractional distillation under reduced pressure. The desired ester comprising butyl 3-butoxypropionate is recovered by fractional distillation under reduced pressure.

EXAMPLE III

A mixture of 0.3 mole of valerolactone along with 1.5 mole of propylmetaborate are placed in a reaction flask along with a catalytic amount of methanesulfonic acid. The flask is then heated and maintained at a temperature in the range of from about 125° C. to about 150° C. for a period of about three hours. At the end of this time the vessel and contents thereof are allowed to return to room temperature and the reaction mixture is recovered after separation from the catalyst. After treatment in the manner hereandbefore set forth in the above examples, the reaction mixture is subjected to separation by means of fractional distillation under reduced pressure. The desired product comprising propyl 5-propoxyvalerate is recovered.

EXAMPLE IV

In this example 0.3 mole of 5-hydroxy-2,4-dimethylvaleric acid lactone and 0.1 mole of trimethyl borate along with a catalytic amount of sulfuric acid are placed in a reaction vessel which is thereafter heated to a temperature of about 110° C. The vessel and contents thereof are maintained at a temperature ranging from about 110° C. to about 130° C. for a predetermined residence time which is about three hours in duration. At the end of this time, the vessel and contents thereof are allowed to return to room temperature and the reaction mixture is recovered. After subjecting the mixture to fractional distillation under reduced pressure, the desired product comprising methyl 2,4-dimethyl-5-methoxyvalerate is recovered. The presence of this compound is confirmed by means of nuclear magnetic resonance and infrared analyses.

I claim as my invention:

1. A process for the preparation of an ether ester of a carboxylic acid which comprises treating, at esterification conditions and in the presence of an acidic catalyst, (A) a lactone of the formula

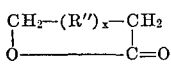

wherein $x$ is zero or 1, and R" is unsubstituted or substituted alkylene of from 1 to 5 carbon atoms in which the substituent(s) are one or two in number and are attached to different carbon atoms of the alkylene chain and are selected from the group consisting of lower alkyl and phenyl, with (B) a borate ester of the formula $(RO)_3B$, $(RO)_2BOH$, $ROB(OH)$ or $ROBO$ in which R is selected from the group consisting of lower alkyl, phenyl, benzyl, tolyl, and $C_5$ or $C_6$ cycloalkyl.

2. The process as set forth in claim 1, further characterized in that said esterification conditions include a temperature in the range of from about 20° C. to about 200° C. and a pressure in the range of from about atmospheric to about 100 atmospheres.

3. The process as set forth in claim 1, further characterized in that said acidic catalyst is sulfuric acid.

4. The process as set forth in claim 1, further characterized in that said acidic catalyst is methanesulfonic acid.

5. The process as set forth in claim 1, further characterized in that said lactone is beta-propiolactone.

6. The process as set forth in claim 1, further characterized in that said lactone is gamma-butyrolactone.

7. The process as set forth in claim 1, further characterized in that said lactone is delta-valerolactone.

8. The process as set forth in claim 1, further characterized in that said lactone is 5-hydroxy-2,4-dimethylvaleric acid lactone.

9. The process as set forth in claim 6, further characterized in that said borate ester is triethyl borate and said ether ester is ethyl 4-ethoxybutyrate.

10. The process as set forth in claim 5, further characterized in that said borate ester is tributyl borate and said ether ester is butyl 3-butoxypropionate.

11. The process as set forth in claim 7, further characterized in that said metaborate ester is propyl metaborate and said ether ester is propyl 5-propoxyvalerate.

12. The process as set forth in claim 8, further characterized in that said borate ester is trimethyl borate and said ether ester is methyl 2,4-dimethyl-5-methoxyvalerate.

References Cited

UNITED STATES PATENTS

| 2,874,165 | 2/1959 | Brown | 260—484 X |
| 2,881,204 | 4/1959 | Kirkpatrick | 260—484 |

OTHER REFERENCES

Steinberg: Organoboron Chemistry, vol. 1, Interscience, 1964, p. 137.

LORRAINE A. WEINBERGER, Primary Examiner

P. J. KILLOS, Assistant Examiner

U.S. Cl. X.R.

252—522; 260—468 R, 473 A, 473 G